July 5, 1960
M. J. LEFF
2,944,159
DIFFERENTIAL ACTION SYNCHRO TRANSDUCER
Filed Sept. 22, 1959
2 Sheets-Sheet 1
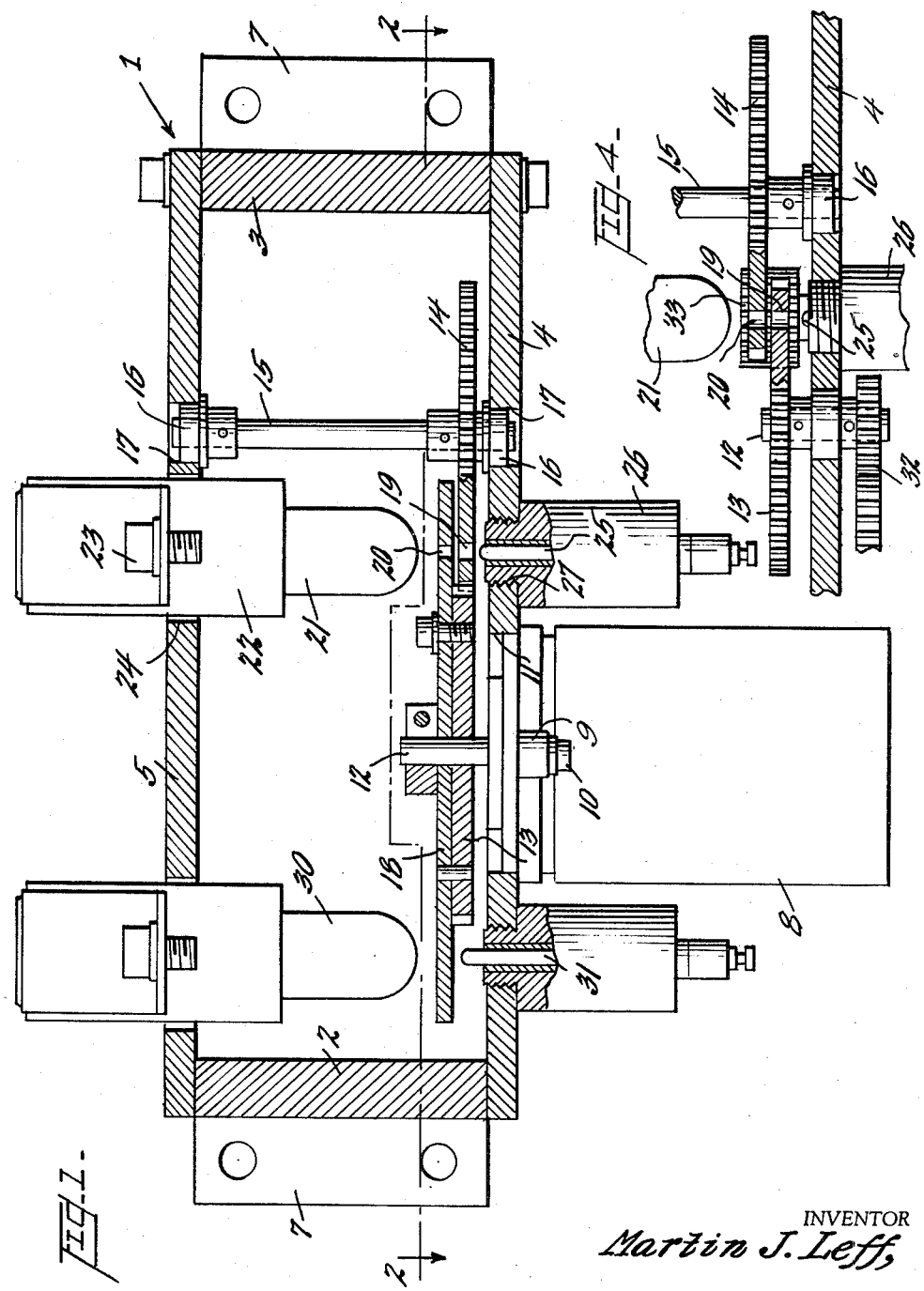
INVENTOR
*Martin J. Leff,*
BY *Borst & Borst*
ATTORNEYS July 5, 1960
M. J. LEFF
2,944,159
DIFFERENTIAL ACTION SYNCHRO TRANSDUCER
Filed Sept. 22, 1959
2 Sheets-Sheet 2
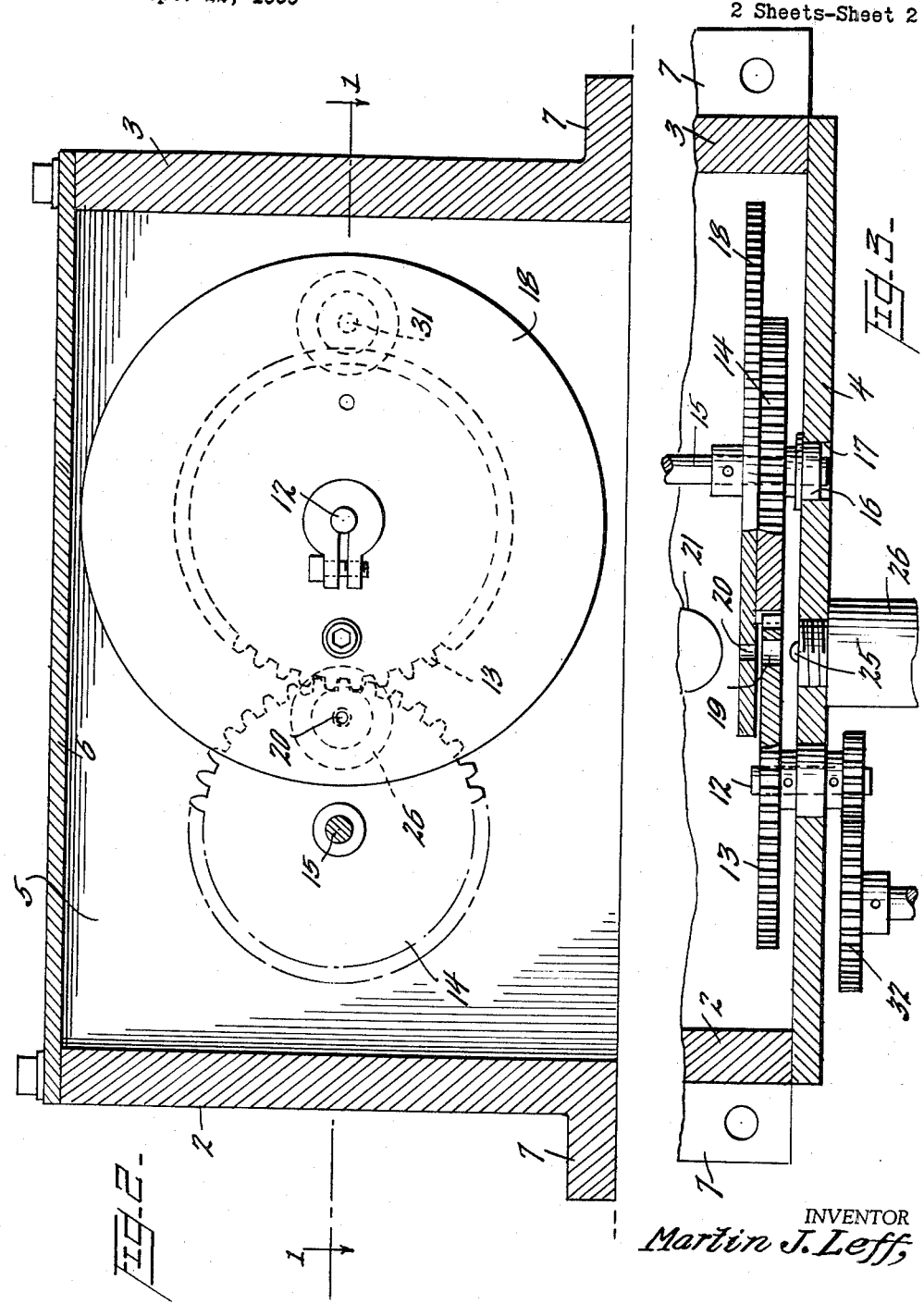
INVENTOR
*Martin J. Leff,*
BY
ATTORNEYS United States Patent Office 2,944,159
Patented July 5, 1960

2,944,159

DIFFERENTIAL ACTION SYNCHRO TRANSDUCER

Martin J. Leff, Bronx, N.Y., assignor to Sperry Rand Corporation, Ford Instrument Company Division, Wilmington, Del., a corporation of Delaware Filed Sept. 22, 1959, Ser. No. 841,575

7 Claims. (Cl. 250—233)

This invention relates to what are generally known as synchro transducers which are operative to transform synchro rotation into electrical pulses. The present invention is especially designed to emit an electrical pulse every Nth revolution of the synchro mechanism, where N is an integer greater than unity. The invention provides for an increase in the number of revolutions per pulse, by differential action, thereby providing better accuracy in measuring the time between rotations of a high speed synchro shaft, than if an electrical pulse was emitted every rotation of the synchro shaft.

The electrical pulses emitted may be imparted to an electronic counter for counting the number of pulses and/or indicating the time between pulses. The pulses may be produced from the rotary motion of any variable or constant speed device such as a synchro, motor, integrator, gear train, or the like. The pulses may be utilized as a timing means for starting or stopping a mechanical or electrical action. They may also act as a rotation-limiting means in which a rotation input is stopped by a pulse-triggered circuit after a predetermined number of revolutions.

Various devices for counting every Nth revolution of a rotating input means are known, but they are all subject to certain inherent defects, such as large size, excessive gearing, inability to operate at high speeds and excessive loading on the synchro receiver, which are due to the utilization of cam and switch arrangements in conjunction with gear trains or stepping switches.

It is therefore the principal object of this invention to provide a differential action synchro transducer which is of simple construction, adaptable to high speed operation, relatively small in size and which requires a minimum number of parts, thereby eliminating the inherent defects of previously known devices of this character.

Having stated the principal object of the invention, other and more limited objects thereof will be apparent from the following specification and the accompanying drawings forming a part thereof, in which the presently preferred embodiment of the invention is disclosed.

In the drawing—

Fig. 1 is a horizontal section through a differential action transducer constructed according to my invention, the plane of the section being indicated by the line 1—1 on Fig. 2;

Fig. 2 is a vertical longitudinal section, the plane of which is indicated by the line 2—2 on Fig. 1;

Fig. 3 is a fragmentary detail section showing a slightly modified construction; and Fig. 4 is a fragmentary detail section showing another slightly modified construction.

The invention comprises generally an input gear, which is driven by any suitable means such as a synchro motor, and a follower gear which meshes with the input gear and is driven thereby. The input gear is provided with a lesser number of teeth than the follower gear and has a circular disk concentrically secured thereto which overlies the follower gear and has a single small aperture therein. The follower gear is provided with an aperture which is adapted to register with the aperture in the disk carried by the input gear every Nth revolution of the input gear, the value of N being dependent on the difference between the number of teeth on the follower gear and the number of teeth on the input gear. A light source and a photo diode are disposed on opposite sides of the input gear and the overlying disk in horizontal alignment with each other and with the point of registration of the apertures in the disk and follower gear. Each time the two apertures register, light projects from the light source through the registering aperture and into the photo diode which causes the photo diode to emit an electrical pulse which is imparted to a receiver.

The mechanism will now be described in detail, reference being had to the drawings in which the numeral 1 indicates generally a housing comprising a pair of vertically disposed longitudinally spaced end walls 2 and 3 which are connected together by the front and rear walls 4 and 5. The upper end of the housing is closed by a removable cover plate 6 and the lower ends of the end walls are provided with outwardly extending feet 7 by which the housing is adapted to be secured in fixed position.

A synchro receiver 8 is secured to the front wall 4 of the housing, by means of lugs 9 and bolts 10, with the inner end thereof disposed in an enlarged complementary aperture 11 in the front wall 4. The armature shaft 12 of the synchro receiver 8 extends into the housing and has an input gear 13 mounted thereon which meshes with a follower gear 14 which is secured on a shaft 15 which is rotatably supported by bearings 16 disposed in apertures 17 in the front and rear walls 4 and 5. The follower gear 14 is adapted to be rotated by the input gear 13 and is provided with a greater number of teeth, at least one, than the input gear 13, so that the follower gear 14 is rotated by the input gear at a lesser r.p.m. than the input gear.

The input gear 13 has a disk 18 secured thereto, for rotation therewith, which overlies an adjacent portion of the follower gear 14. The follower gear 14 is provided with an aperture 19, and the overlying section of the disk 18 is provided with an aperture 20 which is adapted to register with the aperture 19 in the follower gear 14 once every predetermined number of revolutions of the input gear which is dependent upon the difference between the number of teeth on the follower gear and the number of teeth on the input gear, as will be hereinafter explained. The registration point of the apertures 19 and 20 is preferably disposed in a plane which includes the axes of the shafts 12 and 15 on which the gears 13 and 14 are respectively mounted. But this is not necessarily true, as the point of registration of the apertures 19 and 20 must be at a single point of intersection of the path of the aperture 19 in the follower gear 14 with the path of the aperture 20 in the disk 18, which may be above or below the aforesaid plane.

A light source in the form of an electric bulb 21 which is disposed rearwardly of the overlapping sections of the follower gear 14 and the disk 18 is removably mounted in a socket 22 which is secured to the rear wall 5 of the housing 1 by bolts 23 and extends inwardly into the housing 1 through an aperture 24 in the rear wall. A photo diode 25 is suitably mounted in an adapter 26 which is removably secured in a threaded aperture 27 in the front wall 4 of the housing 1. The light bulb 21 and the photo diode 25 are disposed in horizontal alignment with each other and with the point of registration of the apertures 19 and 20. The light bulb 21 is adapted to project light through the apertures 19 and 20, each time they are in alignment, onto the photo diode 25; and the photo diode 25 is operative to impart an electric pulse to a receiving device each time light impinges thereon.

The differential relation of the number of revolutions of the input gear 13 and disk 18 carried thereby between registrations of the apertures 19 and 20, the number of teeth on the input gear, and the number of teeth on the follower gear is in accordance with the equation $$N = \frac{TF}{TF - TI}$$

in which N represents the number of revolutions of the input gear between registrations of the apertures 19 and 20, TI the number of teeth on the input gear, and TF the number of teeth on the follower gear and where (TF−TI) is less than TF/2 and greater than 0. For example, let it be assumed that it was desired to generate a pulse every hundred revolutions of the input gear 13, and that the number of teeth on the follower gear is one hundred. Then according to the above equation $$100 = \frac{100}{100 - TI}$$

TI, the number of teeth on the input gear 13, is therefore 99, since 100−99=1.

As a further example, let it be assumed that it is desired to generate a pulse every fifty revolutions of the input gear 13 and that the number of teeth on the follower gear 14 is one hundred. Then according to the above equation, $$50 = \frac{100}{100 - TI}$$

TI therefore is 98, since 100−98=2.

As a still further example, let it be assumed that it is desired to generate a pulse every hundred revolutions of the input gear 13 and that the number of teeth on the follower gear is two hundred. Then, according to the above equation $$100 = \frac{200}{200 - TI}$$

TI therefore is 198 since 200−198=2.

From the above it will be seen that if the number of teeth on either the input gear 13 or the follower gear 14 is known, the number of teeth on the other of the two gears can be computed by the above equation for any desired number of revolutions of the input gear between registrations of the apertures 19 and 20.

In order to adapt the mechanism for counting every revolution of the input gear 13, I provide a second light source 30 and a second photo diode 31 which are similar to the light source 21 and diode 25 respectively. The light source 30 and diode 31 are disposed in horizontal alignment, preferably diametrically opposite the light source 21 and diode 25, in position for the light source 30 to project light through the aperture 20 in the disk 18 and onto the diode 31 each revolution of the input gear 13 and the disk 18 carried thereby.

In Fig. 3 I have shown a slightly modified construction in which the aperture 19 is disposed in the input gear 13 instead of the follower gear 14, and the disk 18 is secured to the follower gear 14 instead of to the input gear 13, and in which the input gear 13 is driven by a gear train 32. Otherwise the construction is the same as shown in Figs. 1 and 2 and operates in the same manner.

In Fig. 4 I have shown still another slightly modified construction in which the input gear 13 and the follower gear 14 are disposed in offset slightly overlapping relation with each other and in which the disk 18 is dispensed with. In this form of the invention the aperture 20 of the disk 18 is disposed in the input gear 13, and the follower gear 14 is driven by the input gear 13 through an elongated idler gear 33 with which both the input gear 13 and the follower gear 14 mesh. Otherwise this form of the invention is the same as that shown in Figs. 1 and 2 and operates in the same manner.

From the foregoing it will be apparent to those skilled in this art that I have provided a very simple and efficient mechanism for accomplishing the objects of the invention.

It is to be understood that I am not limited to the specific construction shown and described herein, as various modifications may be made therein within the spirit of the invention and the scope of the appended claims.

What is claimed is:

1. A differential action transducer of the character described comprising an input gear, means by which said input gear is rotated, a follower gear having a greater number of teeth than said input gear and which is adapted to be rotated by said input gear, an aperture through one of said gears, a disk secured to the other of said gears for rotation therewith, said disk overlying a portion of said one of said gears and being provided with an aperture, said gear aperture and said disk aperture being adapted to register with each other once every predetermined number of revolutions of said input gear, a light source disposed on one side of said gears and disk, a photo diode disposed on the opposite side of said gears and disk, said light source and said diode being disposed in horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

2. A differential action transducer of the character described comprising an input gear, means by which said input gear is rotated, a follower gear having a greater number of teeth than said input gear and which is adapted to be rotated by said input gear, an aperture through said input gear, a disk secured to said follower gear for rotation therewith, said disk overlying a portion of said input gear and being provided with an aperture, said gear aperture and said disk aperture being adapted to register with each other once every predetermined number of revolutions of said input gear, a light source disposed on one side of said gears and disk, a photo diode disposed on the opposite side of said gears and disk, said light source and said diode being disposed in horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

3. A differential action transducer of the character described comprising an input gear, means by which said input gear is rotated, a follower gear having a greater number of teeth than said input gear and which is adapted to be rotated by said input gear, an aperture through said follower gear, a disk secured to said input gear for rotation therewith, said disk overlying a portion of follower gear and being provided with an aperture, said gear aperture and said disk aperture being adapted to register with each other once every predetermined number of revolutions of said input gear, a light source disposed on one side of said gears and disk, a photo diode disposed on the opposite side of said gears and disk, said light source and said diode being disposed in horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

4. A differential action transducer of the character described comprising an input gear, means by which said input gear is rotated, a follower gear having a greater number of teeth than said input gear and which is adapted to be rotated by said input gear, an aperture through one of said gears, a disk secured to the other of said gears for rotation therewith, said disk overlying a portion of said one of said gears and being provided with an aperture, said gear aperture and said disk aperture being adapted to register with each other once every predetermined number of revolutions of said input gear; the relation of the number of revolutions of said input gear between successive registrations of said apertures, the number of teeth on said input gear and the number of teeth on said follower gear being in accordance with the equation $$N = \frac{TF}{TF - TI}$$

in which N represents the number of revolutions of said input gear between successive registrations of said apertures, TI the number of teeth on said input gear, TF the number of teeth on said follower gear, and where $(TF-TI)$ is less than $TF/2$ and greater than 0; a light source disposed on one side of said gears and disk, a photo diode disposed on the opposite side of said gears and disk, said light source and said diode being disposed in horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

5. A differential action transducer of the character described comprising an input gear, means by which said input gear is rotated, a follower gear having a greater number of teeth than said input gear and which is adapted to be rotated by said input gear, an aperture through said input gear, a disk secured to said follower gear for rotation therewith, said disk overlying a portion of said input gear and being provided with an aperture, said gear aperture and said disk aperture being adapted to register with each other once every predetermined number of revolutions of said input gear; the relation of the number of revolutions of said input gear between successive registrations of said apertures, the number of teeth on said input gear and the number of teeth on said follower gear being in accordance with the equation $$N = \frac{TF}{TF - TI}$$

in which N represents the number of revolutions of said input gear between successive registrations of said apertures, TI the number of teeth on said input gear, TF the number of teeth on said follower gear, and where $(TF-TI)$ is less than $TF/2$ and greater than 0; a light source disposed on one side of said gears and disk, a photo diode disposed on the opposite side of said gears and disk, said light source and said diode being disposed on horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

6. A differential action transducer of the character described comprising an input gear, means by which said input gear is rotated, a follower gear having a greater number of teeth than said input gear and which is adapted to be rotated by said input gear, an aperture through said follower gear, a disk secured to said input gear for rotation therewith, said disk overlying a portion of follower gear and being provided with an aperture, said gear aperture and said disk aperture being adapted to register with each other once every predetermined number of revolutions of said input gear; the relation of the number of revolutions of said input gear between successive registrations of said apertures, the number of teeth on said input gear and the number of teeth on said follower gear being in accordance with the equation $$N = \frac{TF}{TF - TI}$$

in which N represents the number of revolutions of said input gear between successive registrations of said apertures, TI the number of teeth on said input gear, TF the number of teeth on said follower gear, and where $(TF-TI)$ is less than $TF/2$ and greater than 0; a light source disposed on one side of said gears and disk, a photo diode disposed on the opposite side of said gears and disk, said light source and said diode being disposed in horizontal alignment with each other and the registration point of said gear and disk apertures, said light source being adapted to project light through said apertures and onto said photo diode each registration of said apertures, and said photo diode being operative to impart an electrical pulse to a receiving mechanism each time light impinges thereon.

7. A differential action transducer of the character described comprising an input gear, means by which said input gear is rotated, a follower gear having a greater number of teeth than said input gear and disposed in offset slightly overlapping relation with respect to said input gear, an intermediate idler gear through which said follower gear is rotated by said input gear, said input gear and said follower gear being each provided with an aperture in the overlapping portions thereof, said apertures being adapted to register with each other once every predetermined number of revolutions of said input gear; the relation of the number of revolutions of said input gear between successive registrations of said apertures, the number of teeth on said input gear and the number of teeth on said follower gear being in accordance with the equation $$N = \frac{TF}{TF - TI}$$

in which N represents the number of revolutions of said input gear between successive registrations of said apertures, TI the number of teeth on said input gear, TF the number of teeth on said follower gear, and where $(TF-TI)$ is less than $TF/2$ and greater than 0; a light source disposed on one side of said gears, a photo diode disposed on the opposite side of said gears, said light source and said photo diode being disposed in horizontal alignment with each other and the registration point of said apertures, said light source being adapted to project light through said apertures and onto said photo diode each registration of said apertures, and said photo diode being operative to impart an electrical pulse to a receiving mechanism each time light impinges thereon.

References Cited in the file of this patent

UNITED STATES PATENTS

| | | |
|---|---|---|
| 2,246,496 | Asbury | June 24, 1941 |
| 2,268,133 | Carlson | Dec. 30, 1941 |
| 2,525,147 | Nelson | Oct. 10, 1950 |
| 2,898,801 | Rockafellow | Aug. 11, 1959 |